(12) United States Patent
Takahashi

(10) Patent No.: US 8,585,962 B2
(45) Date of Patent: Nov. 19, 2013

(54) NON-FERROUS METAL MELT PUMP AND MELTING FURNACE SYSTEM USING THE SAME

(75) Inventor: Kenzo Takahashi, Matsudo (JP)

(73) Assignee: Zmag, Ltd., Matsudo-shi (JP)

( * ) Notice: Subject to any disclaimer, the term of this patent is extended or adjusted under 35 U.S.C. 154(b) by 182 days.

(21) Appl. No.: 13/043,246

(22) Filed: Mar. 8, 2011

(65) Prior Publication Data

US 2011/0248432 A1    Oct. 13, 2011

(30) Foreign Application Priority Data

Apr. 7, 2010  (JP) ................................ 2010-088793
Jul. 5, 2010  (JP) ................................ 2010-152816

(51) Int. Cl.
    *F27D 3/14*    (2006.01)
(52) U.S. Cl.
    USPC .......................................... 266/234; 266/236
(58) Field of Classification Search
    USPC ................................................. 266/234, 236
    See application file for complete search history.

(56) References Cited

U.S. PATENT DOCUMENTS 3,196,795 A * 7/1965 Baker .............................. 373/85

FOREIGN PATENT DOCUMENTS

| CN | 1793765 A | 6/2006 |
|---|---|---|
| CN | 202157970 U | 3/2012 |
| DE | 1553138 A1 | 2/1970 |
| EP | 1674814 A2 | 6/2006 |
| EP | 1674814 A3 | 5/2007 |
| GB | 1100474 A | 1/1968 |

OTHER PUBLICATIONS

EPO Search Report issued on Jul. 6, 2011 in application EP 11157760.
Combined Chinese Office Action and Search Report issued Mar. 20, 2013 in Patent Application No. 201110063647.5 with English Translation and English Translation of Category of Cited Documents.

* cited by examiner

*Primary Examiner* — Scott Kastler
(74) *Attorney, Agent, or Firm* — Oblon, Spivak, McClelland, Maier & Neustadt, L.L.P.

(57) ABSTRACT

Provided are a non-ferrous metal melt pump having a simple structure capable of tapping non-ferrous metal melt at a low cost without the help of a person, and a melting furnace system using the same. The non-ferrous metal melt pump includes: a container body which includes an inner space and a non-ferrous metal melt passageway, the non-ferrous metal melt passageway having a spiral passageway formed inside a side wall so that a lower end inlet and an upper end open portion, respectively formed in the side wall to be open to the outside, communicate with each other; a magnetic field device, which is rotatable about the vertical axis line, arranged inside the inner space, and the magnetic field device having a magnitude of a magnetic field such that lines of magnetic force moves while penetrating non-ferrous metal melt inside the spiral passageway during the rotation; and a drive device which rotationally drives the magnetic field device.

20 Claims, 5 Drawing Sheets

NON-FERROUS METAL MELT PUMP AND MELTING FURNACE SYSTEM USING THE SAME

BACKGROUND OF THE INVENTION

1. Field of the Invention

The invention relates to a non-ferrous metal melt pump and a melting furnace system using the same.

2. Background Art

Conventionally, as a method of tapping non-ferrous metal, that is, non-ferrous metal of a conductor (a conductive material) such as Al, Cu, and Zn or at least two alloys of these, an Mg alloy or the like from a melting furnace or a holding furnace, there has been known a tapping method in which a hole is perforated in advance in a furnace wall close to a furnace bottom, a stopper blocks the hole, and the stopper is inserted into or taken out from the hole whenever tapping the non-ferrous metal. However, in this method, there is an inevitably big risk of danger at all times since the object is high-temperature non-ferrous metal melt.

Further, as another tapping method that has been practically used, there has been known a method using a vacuum pump. However, this method is not practically used because of poor operability and reliability thereof.

Furthermore, there has been known a tapping method using a mechanical pump. However, this method has a problem in that a blade (carbon) of a pump is severely damaged or running cost is very high.

Further, there has been known a tapping method using an electromagnetic pump. However, this method requires large power consumption, highly-skilled maintenance, and the like. For this reason, this method may be used only for few cases.

SUMMARY OF THE INVENTION

There have been problems in the related art as described above.

The invention has been made in consideration of the above-mentioned circumstances, and an object of the invention is to provide a non-ferrous metal melt pump having a simple structure capable of tapping non-ferrous metal melt at a low cost without the help of a person, and a melting furnace system using the same.

According to an aspect of the invention, there is provided a non-ferrous metal melt pump including: a container body which includes an inner space and a non-ferrous metal melt passageway, the non-ferrous metal melt passageway having a spiral passageway formed inside a side wall so that a lower end inlet and an upper end open portion, respectively formed in the side wall to be open to the outside, communicate with each other; a magnetic field device, which is rotatable about the vertical axis line, arranged inside the inner space, and the magnetic field device having a magnitude of a magnetic field such that lines of magnetic force moves while penetrating non-ferrous metal melt inside the spiral passageway during the rotation; and a drive device which rotationally drives the magnetic field device.

According to the aspect of the invention, a non-ferrous metal melt pump having a simple structure capable of tapping non-ferrous metal melt at a low cost without the help of a person, and a melting furnace system using the same are provided.

DESCRIPTION OF THE EMBODIMENTS

Figure 1:
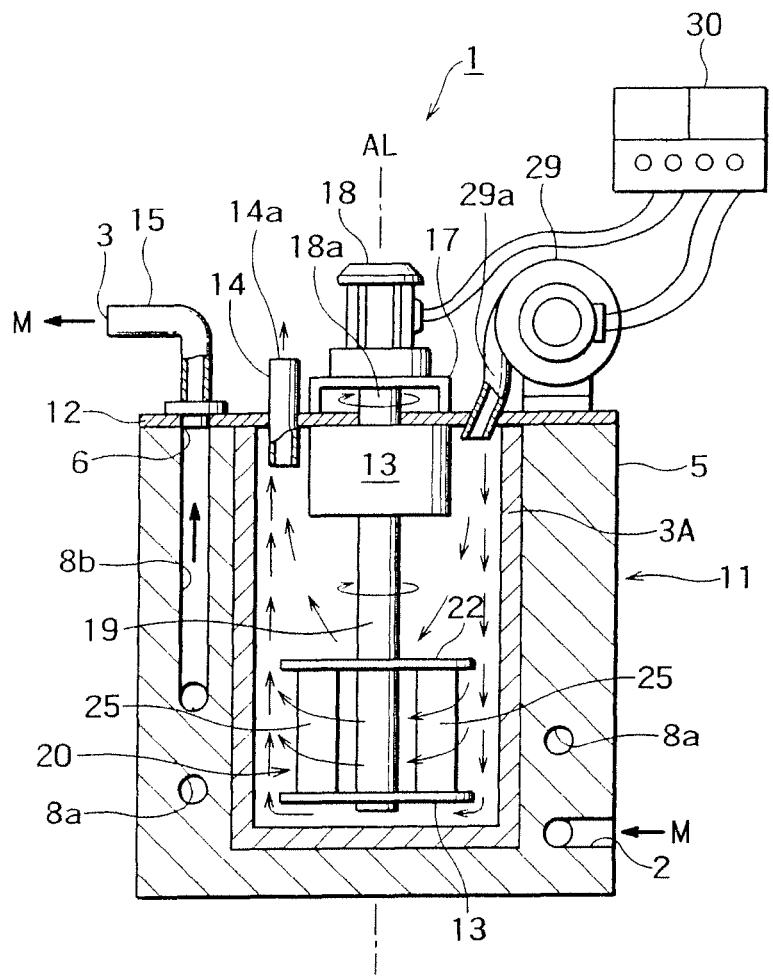
FIG. 1A is a longitudinal sectional view illustrating a non-ferrous metal melt pump of a first embodiment of the invention.
FIG. 1B is a longitudinal sectional view illustrating only a cylindrical container.
Figure 1:
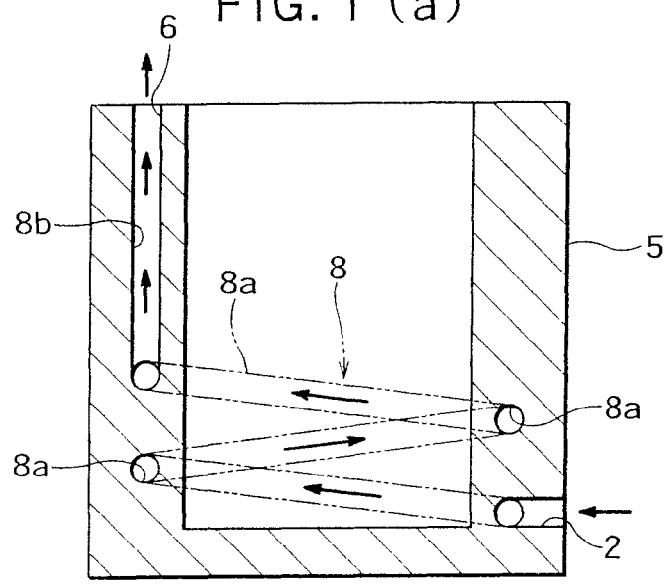

FIG. 1A is a longitudinal sectional view illustrating a first embodiment of the invention, and FIG. 2A is a plan view illustrating the same. As particularly can be seen from FIG. 1A, a non-ferrous metal melt pump 1 of the first embodiment of the invention shown in FIGS. 1A and 2A is configured to tap non-ferrous metal melt [melt of a conductor (a conductive material) such as Al, Cu, and Zn or at least two alloys of these, an Mg alloy or the like] from a melt outlet 3 by suctioning the melt from a lower end inlet 2 by an electromagnetic force.

More specifically, as particularly can be seen from FIG. 1A, the lower end inlet 2 is formed in an open state around a bottom portion of a cylindrical side wall of a cylindrical container 5 made of a fire-resistant material (a heat-resistant material) and serving as an outer cylinder.

An upper end open portion 6 is formed at the upper edge portion of the cylindrical container 5 in an open state to communicate with the melt outlet 3. The upper end open portion 6 is directly shown in FIG. 2C as a plan view in which a cover 12 to be described later is removed. The lower end inlet 2 and the upper end open portion 6 communicate with each other through a non-ferrous metal melt passageway 8 formed inside the cylindrical side wall of the cylindrical container 5. The non-ferrous metal melt passageway 8 includes two passageway portions continuously connected to each other. That is, as particularly can be seen from FIG. 1B only showing the cylindrical container 5, the non-ferrous metal melt passageway 8 includes a spiral passageway 8a formed at the lower half portion of a container body 11 in the height direction and a longitudinal rising passageway 8b formed at the upper half portion in the height direction. which are communicated with each other. Accordingly, non-ferrous metal melt M is driven by an electromagnetic force to be described later, is suctioned from the lower end inlet 2, reaches the rising passageway 8b while turning along the spiral passageway 8a, further rises along the rising passageway 8b, and then is tapped from the melt outlet 3.

Furthermore, the cross-section of the non-ferrous metal melt passageway 8 is depicted as a circular shape, but the shape of the cross-section is not limited to the circular shape. For example, the shape may be an oval shape, a rectangular shape, a polygonal shape, and any other shapes.

As can be seen from FIGS. 1A and 2C, a cylindrical inner container 4 made of a heat-resistant material and serving as an inner cylinder is accommodated inside the cylindrical container 5, thereby forming a so-called double structure container body 11 made of a fire-resistant material. The interior of the container body 11 is formed as a so-called inner space.

As can be seen from FIG. 1A, a cover 12 is provided at the upper open portion of, the container body 11. The cross-sectional view of the cover 12 is shown in FIG. 2B. As particularly can be seen from FIG. 2B, the cover 12 is provided with a melt hole 12a, an air supply hole 12b, an air discharge hole 12c, and an output shaft hole 12d. The air supply hole 12b and the air discharge hole 12c are used to allow the inner space to communicate with the outside thereof.

Further, as particularly can be seen from FIGS. 1A and 2A, an air discharge pipe 14 penetrates the air discharge hole 12c of the cover 12 in a sealed state. The upper end of the air discharge pipe 14 is formed as the air discharge hole 14a.

Furthermore, as particularly can be seen from FIGS. 1A and 2A, a substantially L-shaped tapping pipe 15 is attached to the cover 12. That is, the outlet-side front end of the tapping pipe 15 is formed as the melt outlet 3. The lower end of the tapping pipe 15 communicates with the melt hole 12a of the cover 12 in a sealed state. Furthermore, the melt hole 12a communicates with the rising passageway 8b of the cylindrical container 5. Accordingly, the rising passageway 8b communicates with the melt outlet 3 through the tapping pipe 15. That is, the lower end inlet 2 of the cylindrical container 5 communicates with the melt outlet 3 through the spiral passageway 8a, the rising passageway 8b, and the tapping pipe 15.

As particularly can be seen from FIGS. 1A and 2A, a drive motor (a drive device) 18 having an output shaft 18a along the vertical axis line AL is attached to the upper surface of the cover 12 through a mount 17. Then, a shaft 19 is rotatably provided at the lower surface of the cover 12 while being supported by a bearing 13. The output shaft 18a is connected to the shaft 19 through the output shaft hole 12d of the cover 12 by means of a coupling (not shown) so that a rotational force may be transmitted. That is, the output shaft 18a is coupled to the shaft 19, so that the rotation of the output shaft 18a is transmitted to the shaft 19.

A magnetic field device 20 is attached to the lower end portion of the shaft 19. That is, the magnetic field device 20g is provided in a suspended sate inside the inner container 4 by the cover 12. As for the magnitude of the magnetic field of the magnetic field device 20, the magnetic force line ML is output in the substantially horizontal direction, penetrates the non-ferrous metal melt inside the spiral passageway 8a, and returns again in the horizontal direction. Accordingly, when the drive motor 18 is operated, the magnetic field device 20 rotates, so that the magnetic force line ML rotates and moves while penetrating the non-ferrous metal melt M inside the spiral passageway 8a. By the electromagnetic force generated at this time, the non-ferrous metal melt M flows and rises while turning along the spiral passageway 8a, further rises when reaching the rising passageway 8b, and is tapped from the melt outlet 3 when reaching the tapping pipe 15.

As described above, the magnetic field device 20 may be configured such that the output magnetic force line ML penetrates the non-ferrous metal melt M inside the spiral passageway 8a, and specifically, various configurations may be adopted.

Figure 3:
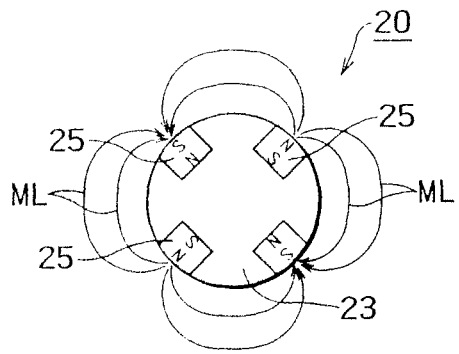
FIG. 3A is a plan view illustrating a magnetic field device.
FIG. 3B is a plan view illustrating a magnetic field device of another embodiment.
Figure 3:
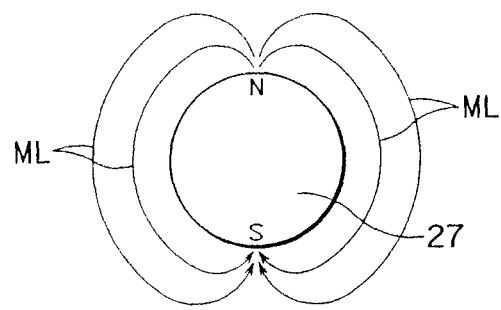

For example, a configuration shown in FIG. 3A or 3B may be used.

FIG. 3A shows a case where four permanent magnets 25 disposed around the axis line AL are used. That is, a plurality of, for example, four pillar-shaped permanent magnets 25 is sandwiched between an upper plate 22 and a lower plate 23 so as to be arranged on an imaginary circumference. Each permanent magnet 25 is magnetized so that the inner and outer peripheral sides around the axis line AL become magnetic poles. Furthermore, in two permanent magnets 25 and 25 adjacent to each other in the circumferential direction, the magnetic poles of the inner and outer peripheral sides are magnetized so as to be different from each other. Accordingly, as can be seen from FIG. 3A, the magnetic force line ML output from a certain permanent magnet 25 enters a different permanent magnet 25 adjacent thereto. Then, as described above, the magnetic force line ML penetrates the non-ferrous metal melt M inside the spiral passageway 8a. Accordingly, in accordance with the rotation of the magnetic force line ML, the non-ferrous metal melt M rises inside the spiral passageway 8a while turning along the passageway.

FIG. 3B shows a case where one permanent magnet is used. That is, as shown in FIG. 3B, the magnetic field device 20 may be configured as one pillar-shaped permanent magnet 27. In the permanent magnet 27, both side portions facing each other in the horizontal direction with the axis line AL interposed therebetween are magnetized to different magnetic poles. The magnetic force line ML output from the permanent magnet 27 also acts on the non-ferrous metal melt M inside the spiral passageway 8a. Accordingly, the non-ferrous metal melt M rises inside the spiral passageway 8a while turning along the passageway.

Even when the magnetic field device 20 of FIG. 3B is used, the magnetic field device 20 may be attached to the shaft 19 by a certain member so that the magnetic field device 20 is rotationally driven by the shaft 19.

Furthermore, as particularly can be seen from FIGS. 1A and 2A, a blower 29 is provided on the cover 12. An air supply pipe 29a of the blower 29 communicates with the air supply hole 12b of the cover 12 in a sealed state. Accordingly, when air is supplied from the blower 29, the air flows inside the inner space as depicted by the arrow of FIG. 1A to cool the respective portions, and is discharged to the outside from the air discharge hole 14a.

Figure 2:
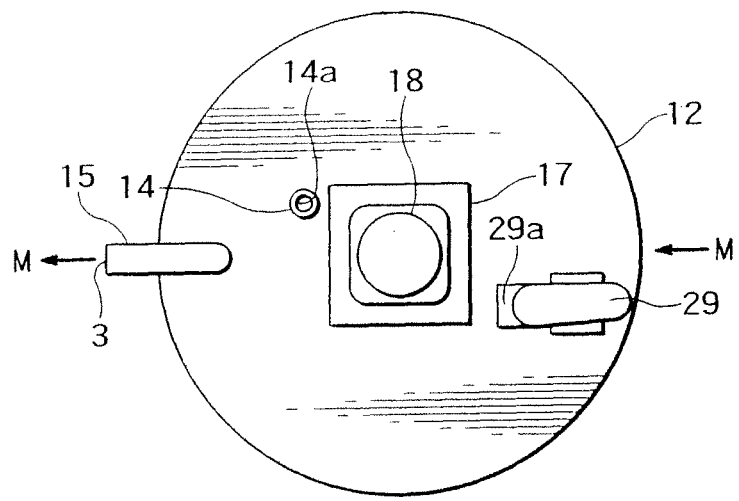
FIG. 2A is a plan view illustrating the non-ferrous metal melt pump of FIG. 1.
FIG. 2B is a cross-sectional view illustrating a cover.
FIG. 2C is a plan view illustrating a state where the cover of FIG. 2A is removed.
Figure 2:
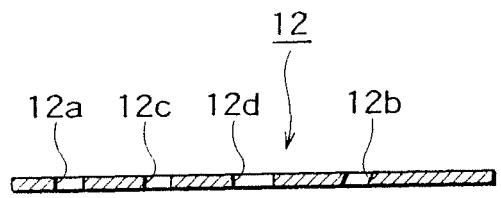
Figure 2:
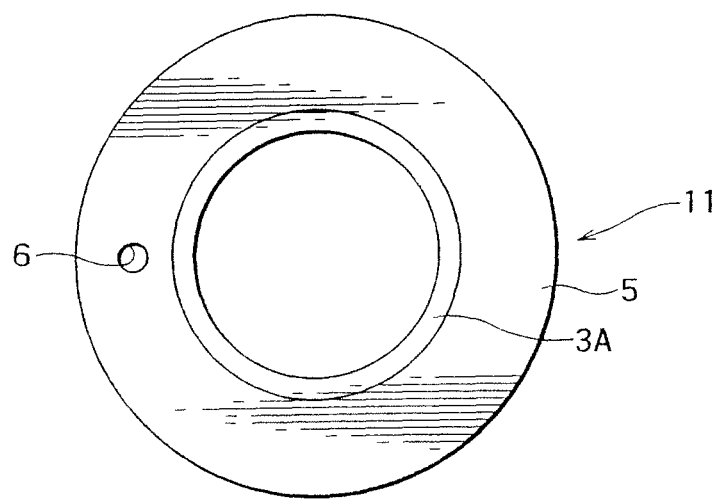

Furthermore, in FIG. 2, a power control panel 30 supplies power to the drive motor 18 and the blower 29 and controls them.

An operation of the non-ferrous metal melt pump 1 having the above-described configuration will be described.

The non-ferrous metal melt pump 1 is used while the pump is immersed in the non-ferrous metal melt M, that is, as least the lower end inlet 2 is immersed in the non-ferrous metal melt M. Furthermore, it is desirable that the blower 29 is operated at all times in order to tap the melt while maintaining the cooled state.

An operation of the pump will be described as below.

Generally, when a magnetic field (the magnetic force line ML) acts on non-ferrous metal melt M and the magnetic field moves, an eddy current is generated in the non-ferrous metal melt M. As a result, an electromagnetic force is generated in non-ferrous metal melt in the magnetic field moving direction. Then, in the invention, the passageway (the spiral passageway 8a) of the non-ferrous metal melt is disposed to have a certain angle with respect to a magnetic field moving plane (a plane on which an electromagnetic force acts). For this reason, the magnetic force acting on the non-ferrous metal melt is divided into a vertical component and a horizontal component. Due to the vertical component, the non-ferrous metal melt inside the spiral passageway 8a is pushed upward. Accordingly, the non-ferrous metal melt inside the spiral passageway 8a moves upward while performing a spiral movement accompanying the rotation of the magnetic field device 20. Finally, the non-ferrous metal melt reaches from the spiral passageway 8a to the rising passageway 8b. The non-ferrous metal melt inside the rising passageway 8b is pushed backward to rise, reaches the tapping pipe 15, and is tapped from the melt outlet 3 to the outside thereof. At this time, new non-ferrous metal melt is suctioned from the lower end inlet 2 with the movement inside the spiral passageway 8a of the non-ferrous metal melt, and is supplied into the spiral passageway 8a. Accordingly, the non-ferrous metal melt is continuously suctioned from the lower end inlet 2, and is tapped from the melt outlet 3 to the outside thereof.

Here, the moving speed and the height (the lifting height) of the non-ferrous metal melt M are proportional to the moving speed (the rotation speed) of the magnetic field. Accordingly, when the rpm of the magnetic field device 20 is controlled by an inverter, the tapping amount, the lifting height, and the tapping speed may be adjusted. Further, the lifting height may be arbitrarily set by making the cylindrical container 5, that is, the spiral passageway 8a to be long.

Figure 4:
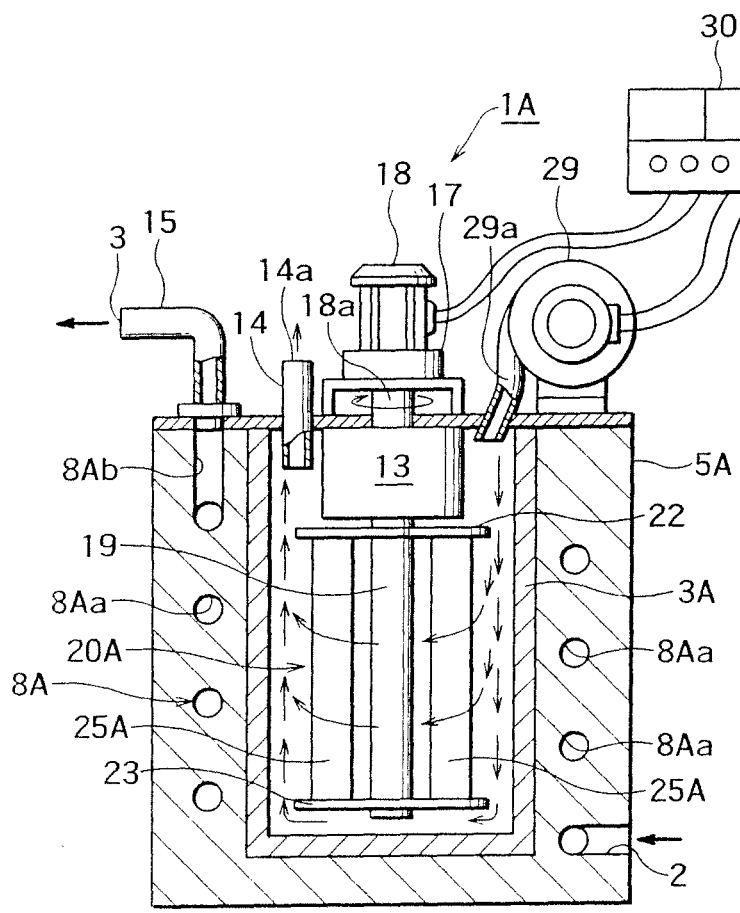
FIG. 4 is a longitudinal sectional view illustrating a non-ferrous metal melt pump of a second embodiment.

FIG. 4 is a longitudinal sectional view illustrating a non-ferrous metal melt pump 1A of a second embodiment as a modified example of the non-ferrous metal melt pump 1 of the first embodiment of FIG. 1A. The second embodiment is different from the first embodiment in that a spiral passageway 8Aa of the non-ferrous metal melt passageway 8a formed in the cylindrical container 5A is lengthened, a rising passageway 8ab is shortened, and a magnetic field device 20A is lengthened to correspond to the spiral passageway 8Aa. That is, the spiral passageway 8Aa is formed throughout the substantially entire container body 11A in the height direction.

Likewise, since the magnetic field device 20A is lengthened, the efficiency of driving the non-ferrous metal melt using the magnetic field device 20A may be further improved.

Further, even when the cylindrical container 5A of FIG. 4 is used as the cylindrical container, if the magnetic field device includes various permanent magnets having different lengths and the permanent magnets are exchanged if necessary, that is, the magnetic field device 20 of FIG. 1A or the magnetic field device 20A of FIG. 4 is used as the magnetic field device and the magnetic field device including permanent magnets having different lengths is used, the ability of driving the non-ferrous metal melt M may be changed.

Figure 5:
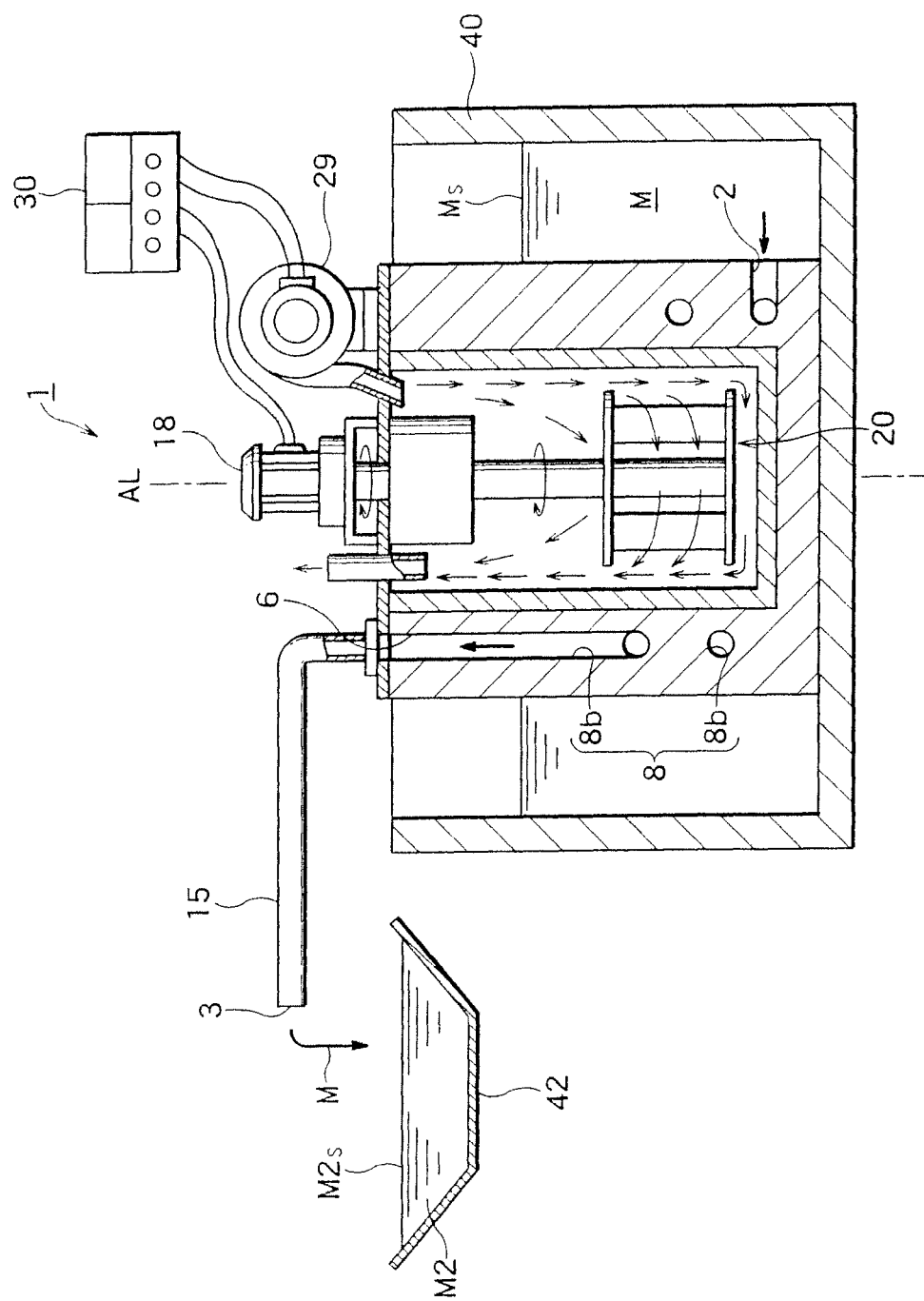
FIG. 5 is a longitudinal sectional view illustrating a melting furnace system using the non-ferrous metal melt pump of FIGS. 1A and 1B.

FIG. 5 illustrates a melting furnace system adopting the non-ferrous metal melt pump 1 of the invention shown in FIG. 1A.

As can be seen from FIG. 5, the non-ferrous metal melt pump 1 is accommodated in a holding furnace (or a melting furnace) 40, and is directly immersed in the non-ferrous metal melt M. At this time, at least the lower end inlet 2 is immersed in the non-ferrous metal melt M.

In order to immerse the lower end inlet in the high-temperature non-ferrous metal melt M, it is desirable that the blower 29 is normally turned on.

When the drive motor 18 is turned on, as described above, an electromagnetic force acts on the non-ferrous metal melt M inside the spiral passageway 8a, the non-ferrous metal melt M moves upward while turning along the spiral passageway 8a in a spiral shape, and is tapped from the melt outlet 3 through the rising passageway 8b and the tapping pipe 15. At this time, since the non-ferrous metal melt M is continuously suctioned from the lower end inlet 2, the non-ferrous metal melt M is continuously discharged from the melt outlet 3 to a receiving container 42.

Figure 6:
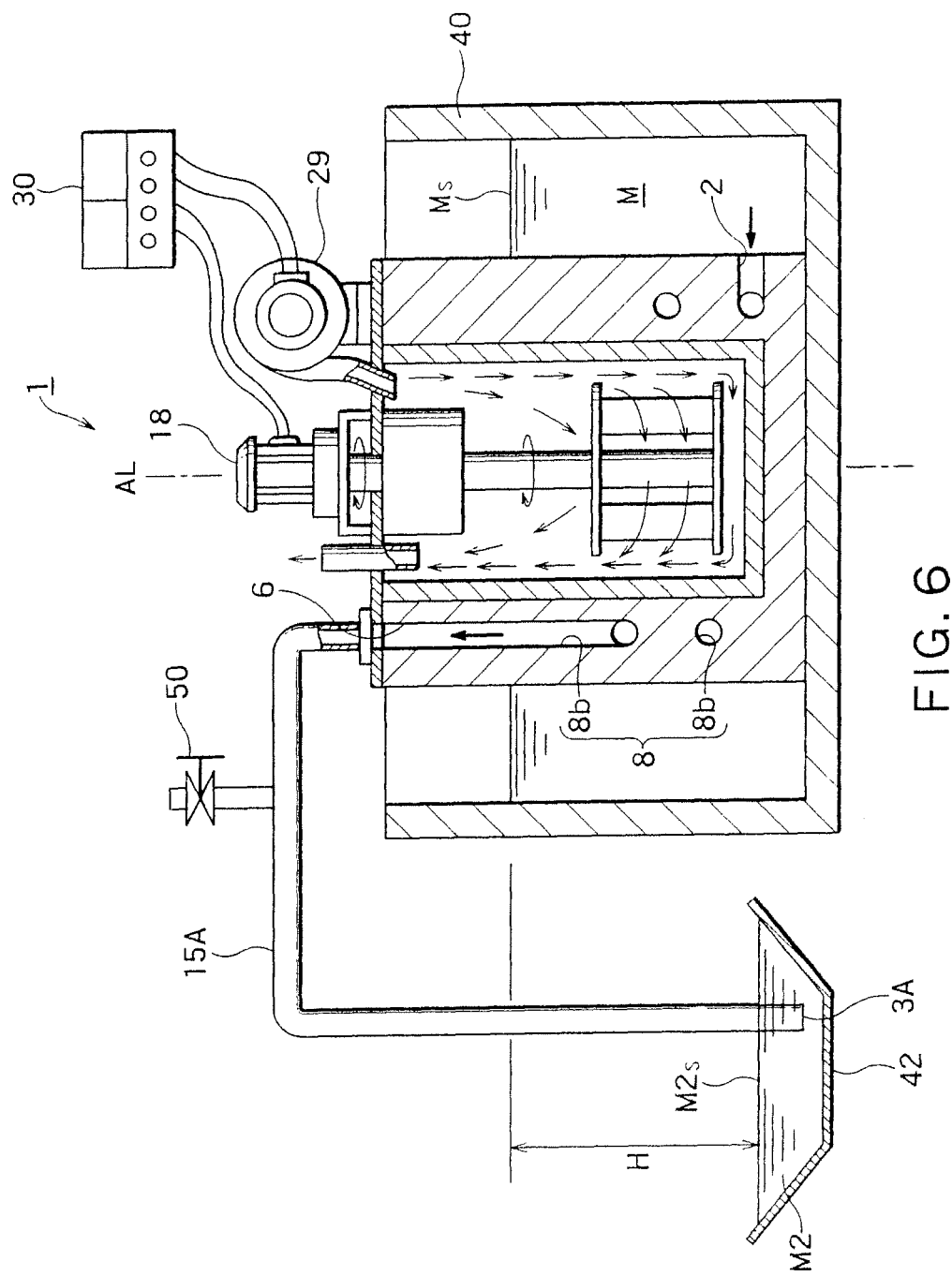
FIG. 6 is a longitudinal sectional view illustrating a melting furnace system of another embodiment.

FIG. 6 is a longitudinal sectional view illustrating a modified example of the melting furnace system of FIG. 5.

In the melting furnace system 1A of FIG. 6, if energy is supplied from the magnetic field device 20 to tap the melt from a melt outlet 3A, even when the magnetic field device 20 is stopped to stop the supply of energy, the melt is continuously tapped by the principle of Siphon.

More specifically, the system of FIG. 6 is different from the melting furnace system 1 of FIG. 5 as below.

The receiving container 42 is disposed at a position lower than that of FIG. 5. Accordingly, a melt surface M2s of melt M2 inside the receiving container 42 is lower than a melt surface Ms of the melt M inside the holding furnace 40.

A tapping pipe 15A is bent downward and extends, the melt outlet 3A of the front end is inserted into the melt M2 inside the receiving container 42.

In this state, the melt M is tapped from the melt outlet 3A by the magnetic field device 20. Even when the magnetic field device 20 is stopped later, the melt is continuously tapped by the principle of Siphon.

That is, as the structure of the system, the tapping pipe 15A needs to be lengthened so that the position of the melt outlet 3A is located at a position lower than at least the melt surface Ms of the melt M inside the holding furnace 40.

Further, an air releasing valve 50 is provided at the transverse portion located at the highest position in the tapping pipe 15A. This is configured so that the melt M smoothly moves upward along the tapping pipe 15A when activating the pump as described below.

More specifically, it may be described below.

The melting furnace system 1A having the above-described configuration is more specifically operated as below.

When the power panel 30 is turned on, the melt M reaches the tapping pipe 15A through the non-ferrous metal melt passageway 8 (the spiral passageway 8a and the rising passageway 8b), and is tapped from the melt outlet 3A into the melt M2 inside the receiving container 42.

That is, the tapping pipe 15A is fully filled with air before the operation is started. The air disturbs the smooth upward movement of the melt M inside the non-ferrous metal melt passageway 8 and the tapping pipe 15A. For this reason, the valve 50 of the tapping pipe 15A is opened before the operation so that the air is released to the outside. Then, the operation is started in this state. Accordingly, the melt M rises in the non-ferrous metal melt passageway 8 (8a and 8b) of the cylindrical container 5 while turning along the passageway, reaches the tapping pipe 15A, and starts to rise in the base end portion of the tapping pipe 15A. Due to the rising melt, the air inside the tapping pipe 15 is extruded from the valve 50. When the melt M reaches the position of the valve 50, the valve 50 is closed. After that, the melt M is smoothly tapped into the melt M2 inside the receiving container 42 through the tapping pipe 15A without being disturbed by the air inside the tapping pipe 15A. Even when the corresponding switch of the power panel 30 is turned off later, the melt M inside the holding furnace 40 is continuously tapped into the receiving container 42 due to a difference H in height between the melt surface Ms of the melt M inside the holding furnace 40 and the melt furnace M2s of the melt M2 inside the receiving container 42, that is, the principle of Siphon. That is, the melt is continuously tapped even when energy is not artificially supplied continuously from the outside.

The invention claimed is:

1. A non-ferrous metal melt pump comprising:
a container body which includes an inner space and a non-ferrous metal melt passageway, the non-ferrous metal melt passageway being formed inside a side wall so that a lower end inlet and an upper end open portion, respectively formed in the side wall to be open to the outside, communicate with each other, the non-ferrous metal melt passageway having a spiral passageway and a successive vertical rising passageway, the lower end inlet communicating with one end of the spiral passageway, the other end of the spiral passageway communicating with one end of the vertical rising passageway, and the other end of the vertical rising passageway communicating with the upper end open portion;

a magnetic field device for driving non-ferrous metal melt in the spiral passageway, which is rotatable about a vertical axis line, arranged inside the inner space, and the magnetic field device having a magnitude of a magnetic field such that lines of magnetic force move while penetrating non-ferrous metal melt inside the spiral passageway during the rotation so that the melt in the spiral passageway spirally moves up to push up the melt in the vertical rising passageway along the vertical direction towards the upper end open portion; and a drive device which rotationally drives the magnetic field device.

2. The non-ferrous metal melt pump according to claim 1, wherein an upper end of the spiral passageway communicates with the upper end open portion through the vertical rising passageway formed inside the side wall of the container body.

3. The non-ferrous metal melt pump according to claim 1, wherein the magnetic field device is configured as a permanent magnet.

4. The non-ferrous metal melt pump according to claim 3, wherein the magnetic field device includes a plurality of permanent magnets arranged about the axis line, each permanent magnet is magnetized so that the inside and the outside thereof with respect to the axis line become magnetic poles, and the plurality of magnetic poles is disposed so that different magnetic poles are alternately arranged along the outer peripheral sides and along the inner peripheral sides thereof about the axis line, respectively.

5. The non-ferrous metal melt pump according to claim 3, wherein the magnetic field device includes one permanent magnet, and the permanent magnet is magnetized so that both sides facing each other in the transverse direction with the axis line interposed therebetween become magnetic poles.

6. The non-ferrous metal melt pump according to claim 1, further comprising:

a cover which blocks the inner space in the container body, wherein the magnetic field device is rotatably attached to the cover in a suspended state.

7. The non-ferrous metal melt pump according to claim 6, wherein the drive device is attached onto the cover.

8. The non-ferrous metal melt pump according to claim 1, wherein an output shaft of the drive device is connected to a shaft rotatably supporting the magnetic field device by a coupling so that a rotation force is transmitted.

9. The non-ferrous metal melt pump according claim 1, wherein the cover includes an air supply hole and an air discharge hole allowing the inner space to communicate with the outside thereof, and cooling air is supplied from the air supply hole into the inner space and is discharged from the air discharge hole to the outside thereof.

10. The non-ferrous metal melt pump according to claim 9, wherein an air supply pipe of a blower communicates with the air supply hole, and an air discharge pipe communicates with the air discharge hole.

11. The non-ferrous metal melt pump according to claim 1, wherein the container body is formed as a double structure container having a cylindrical container serving as an outer cylinder and an inner container serving as an inner cylinder, and the non-ferrous metal melt passageway is formed in the side wall of the cylindrical container.

12. The non-ferrous metal melt pump according to claim 2, wherein the spiral passageway is formed in a lower half portion of the container body in the height direction, and the rising passageway is formed in an upper half portion thereof.

13. The non-ferrous metal melt pump according to claim 1, wherein the spiral passageway is formed throughout the substantially entire container body in the height direction.

14. The non-ferrous metal melt pump according to claim 1, wherein a melt hole is formed in a cover, a tapping pipe communicating with the melt hole is attached to the cover, and the melt hole communicates with the non-ferrous metal melt passageway in a sealed state.

15. The non-ferrous metal melt pump according to claim 1, further comprising:

one container body; and a plurality of magnetic field devices generating different magnitudes of magnetic fields, wherein the plurality of magnetic field devices may be arbitrarily exchanged for use with respect to the container body.

16. The non-ferrous metal melt pump according to claim 1, wherein a cross-section of the non-ferrous metal melt passageway is formed in a circular shape, an oval shape, a rectangular shape, or a polygonal shape.

17. The non-ferrous metal melt pump according to claim 14, wherein the tapping pipe is connected to the upper end open portion to communicate with each other, and a melt outlet is formed in a front end of the tapping pipe to tap the non-ferrous metal melt to the outside thereof.

18. The non-ferrous metal melt pump according to claim 17, wherein the melt outlet is provided at a position higher than that of the lower end inlet.

19. A melting furnace system comprising:

the non-ferrous metal melt pump according to claim 1 and a furnace which includes a receiving space receiving non-ferrous metal melt, wherein the non-ferrous metal melt pump is allowed to be received in the receiving space while the lower end inlet is immersed in the non-ferrous metal melt received in the receiving space.

20. A melting furnace system comprising:

the non-ferrous metal melt pump according to claim 17; and a furnace which includes a receiving space receiving non-ferrous metal melt, wherein the non-ferrous metal melt pump is allowed to be received in the receiving space while the lower end inlet is immersed in the non-ferrous metal melt received in the receiving space, and the position of the melt outlet of the tapping pipe is lower than a melt surface of the melt received in the furnace, whereby the melt passageway and tapping pipe form a siphon.

* * * * *